May 18, 1937. H. BOOTH Re. 20,366

VISIBLE INVENTORY AND SALES RECORDING DEVICE

Original Filed Jan. 31, 1934 2 Sheets-Sheet 1

INVENTOR
Henry Booth
BY
Blair Curtis & Dunne
his ATTORNEYS

VISIBLE INVENTORY AND SALES RECORDING DEVICE

Original Filed Jan. 31, 1934 2 Sheets-Sheet 2

INVENTOR
Henry Booth
BY
Blair Curtis & Dunn
his ATTORNEYS

Reissued May 18, 1937 Re. 20,366

UNITED STATES PATENT OFFICE 20,366

VISIBLE INVENTORY AND SALES RECORDING DEVICE

Henry Booth, Yonkers, N. Y.

Original No. 2,037,192, dated April 14, 1936, Serial No. 709,094, January 31, 1934. Application for reissue January 2, 1937, Serial No. 118,931

13 Claims. (Cl. 40—19.5)

Figure 1:
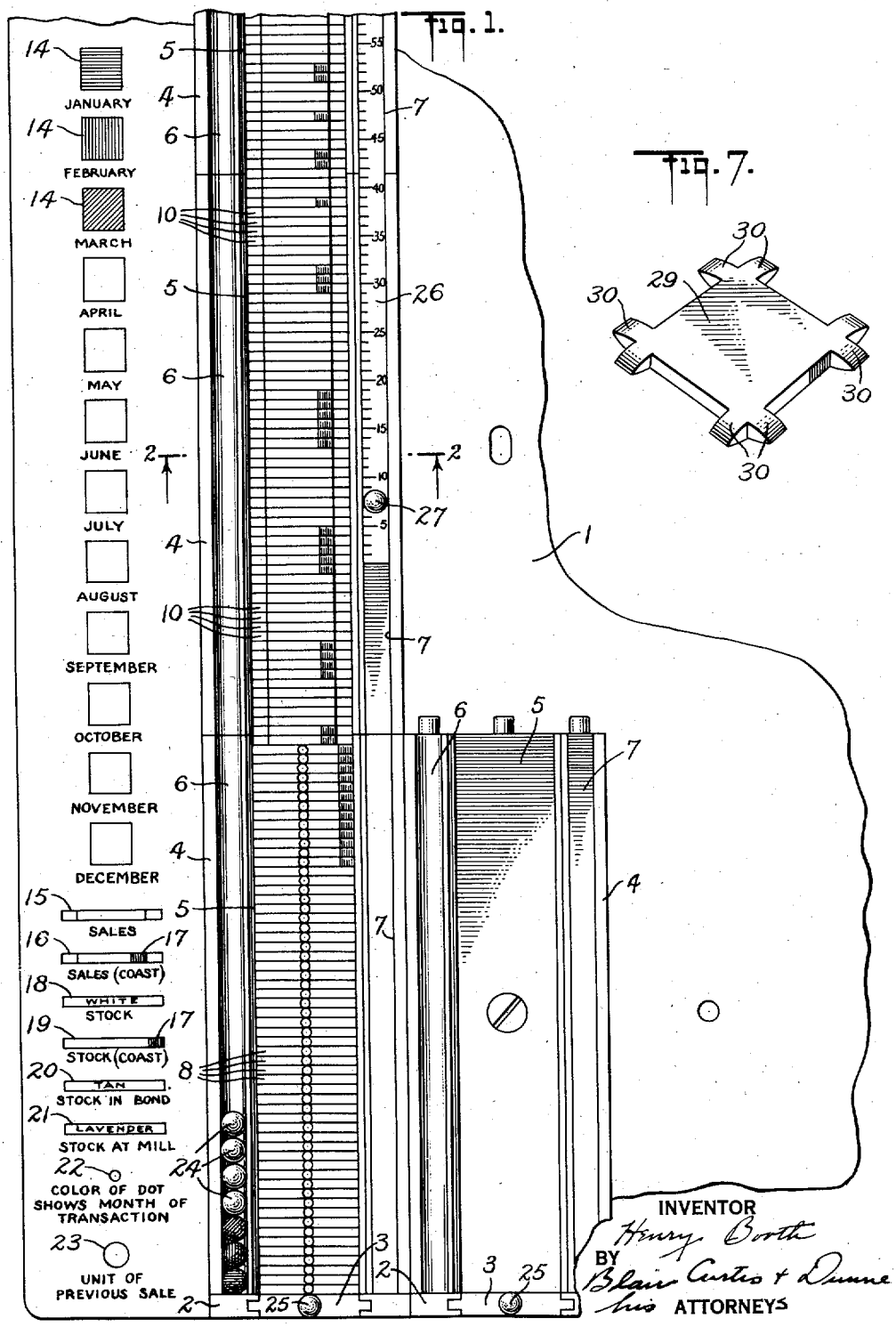

The present invention relates to apparatus for and method of indicating merchandise inventory and sales. An object thereof has been in part to provide a compact and flexible device which affords an accurate and informative quantitative representation of merchandise inventory and of the movement of merchandise, referred to any desired or convenient period of time. An object of my improved method has been to simplify and clarify the operation of inventory control and of cumulatively representing the amount of merchandise bought and sold. In a more specific embodiment, my invention is intended to provide instrumentalities for readily showing comparisons, for example, of the quantities of different styles or kinds of merchandise in inventory and/or the rates of sale of different styles or kinds of merchandise and/or of the same kind of merchandise during different periods of time and/or at different places.

A preferred form of apparatus embodying my invention and adapted for use in a branch of the textile industry, for example, is illustrated in the drawings acompanying this specification and in which—

Figure 2:
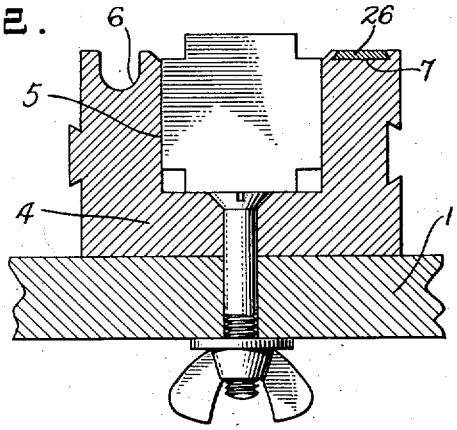
Figure 3:
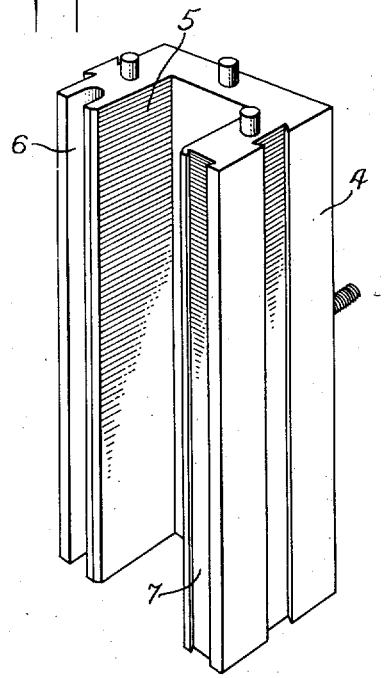
Figure 4:
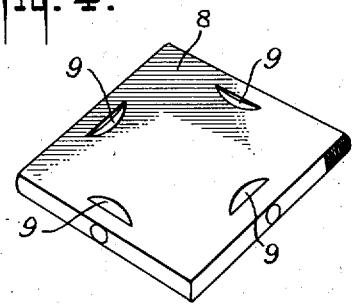
Figure 5:
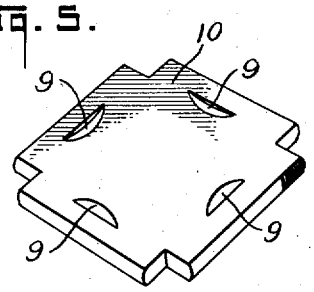
Figure 8:
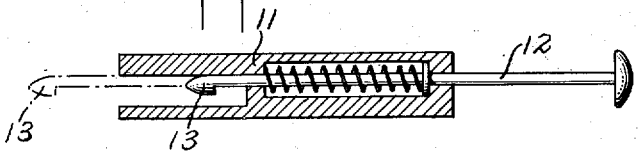

Figure 1 is a front elevation;

Figure 2, a transverse section on the line 2—2 of Figure 1;

Figure 3, a view in perspective of a tally receiving and accumulating member;

Figure 4, a view in perspective of one form of tally or counter;

Figure 5, a similar view of another form of tally or counter;

Figure 6, a tally removing tool shown in longitudinal section; and

Figure 7, a view in perspective of a modified form of tally.

Referring to the drawings, the form of apparatus there shown includes a frame comprising a base 1 in the form of an upright panel and a bottom flange 2 provided with removable gates or slides 3, slidably mounted therein, and each having a knob or finger hold 25.

A suitable tally or counter receptacle, as a holder 4, is secured to the base 1 with its lower end resting upon the flange 2. A main groove or recess 5 extends longitudinally of said holder, which is also provided with a smaller groove 6 and an undercut edge groove 7, Figure 3. The holder 4, preferably made in sections, is so arranged that the several grooves of one section are aligned with those of the next contiguous section when assembled as shown in Figure 1. Where different grades, kinds or styles of merchandise are involved, the apparatus will be designed to accommodate one or more rows of holders 4, in which case the sections are interlocked laterally or otherwise suitably connected in side by side arrangement. The main recess 5 of each holder 4 is aligned with and normally closed at its bottom end by the removable portions 3 of flange 2.

Counters or tallies for use with my improved apparatus may obviously be embodied in a wide variety of shapes, sizes, materials, colors, etc. With the type of frame shown, unit counters or tallies such as those illustrated in Figures 4 and 5 are satisfactory. Each consists of a flat relatively thin plate having rounded edges and of suitably durable material, all being of equal thickness. The tally 8, Figure 4, is substantially square and provided with notches 9 positioned to be engaged by a removing tool, Figure 6. The tally 10, Figure 5, differs from tally 8 in that its four corners are cut away. Tallies having other differences in outline or shape may be employed in addition to or as substitutes for those above described.

The tally removing tool, Figure 6, includes a housing 11 carrying a spring pressed push rod 12 provided at one end with a hook 13 which, when inserted between contiguous tallies, as arranged in Figure 1, engages a notch 9, and, when withdrawn, carries the tally with it. Insertion of a tally between others of the kind shown is facilitated by inserting the pointed end of hook 13 between the edges of adjacent tallies to separate them.

The tally 29 shown in Figure 7 includes projecting end and side portions 30 which are preferably tapered to a narrow edge to facilitate the insertion of a tally between two others without the use of a tool. A table or chart of symbols may conveniently be made a part of or mounted upon the base 1. For example, the markings 14 represent different colors correlated with the names of the months. The marking 15 represents an end or edge of a tally, like 10, Figure 5. The marking 16 represents a tally 10 having an additional color marking 17 which, in the form and position shown, signifies a sale made at some designated place different from that indicated by the plain edge represented by marking 15.

Markings 18 and 19 disclose similar information in respect to the location of inventory merchandise. Markings 20 and 21 represent inventory tallies of different color to distinguish between merchandise held in bond and merchandise at the mill for example. A dot, as 22, appearing on a tally indicates by its color the month in which the transaction involving the merchandise represented by said tally took place. The marking 23 represents a predetermined multiple of units of merchandise sold and relates to the smaller tallies 24 arranged in the small groove 6. These multiple tallies are colored to correspond to the month designating colors 14.

The groove 7 is provided with undercut edges which retain a slidable scale member 26 having markings by reference to which the number of tallies in any group may be quickly and accurately ascertained. A knob or finger piece 27 facilitates sliding movement of scale 26.

In operation, assuming that the record begins as of January 1st and that the merchandise consists of textiles dealt in by the bolt, for example, a given number of lavender tallies 21, one per bolt, will be placed in position at the bottom of main recess 5, Figure 1. Colored dots 22 on these tallies show the months in which the corresponding goods were ordered. Next, a group of tan tallies 20 is superimposed on the first group and represent the goods in bond. Suitably colored dots 22 on these tallies identify the months in which the several lots of merchandise went into bond. A group of white or stock tallies 18 also bearing appropriate month dots is superimposed on the tan tallies. If merchandise is stocked at another place of business, a marking 17 on tally 19 indicates where the unit of merchandise is located. When a sale of a unit of merchandise is made, an inventory tally 8, marked as shown at 18, is removed and a suitably colored sales tally 10 placed on top of the pile. This tally is colored to indicate the month in which the sale took place. If the sale was made out of stock at another place, a sale tally marked as shown at 16 and having the place mark 17 is used to replace a corresponding inventory tally. The tallies 24 may represent multiples of 10, 100, or other convenient number of bolts or other units. Thus, if the sales in January exceed the number represented by a multiple tally, such a tally, appropriately colored, will be inserted at the bottom of groove 6 and a corresponding number of sales tallies will be removed from the January group in recess 5. This arrangement, as well as others which readily suggest themselves, is intended to provide maximum capacity and flexibility for a given size of apparatus.

The operations above noted are repeated for each succeeding month and, as the tallies are added or replaced, the apparatus affords an accurate and comprehensive record not only of the quantities of goods handled but of their rate of movement as well. Where different stacks of tallies represent transactions involving different grades, kinds, or styles of textiles, they afford a most effective means for readily comparing the inventory conditions and rate of movement of one with another or others. At the end of a record period or at any other time, the pile or stack of tallies or a portion thereof may be readily discharged by withdrawing the removable gate 3 of flange 2.

It is contemplated that apparatus embodying the invention above described, or employed in connection with the method above set forth, may be used advantageously in widely differing kinds of business and, in many cases, with obvious modifications or departures from the specific embodiment described and shown herein. The use of such apparatus by an executive or other responsible person or head not only provides a complete picture of the business transactions involved, but does so at a relatively small cost in time. Furthermore, careful use of the apparatus gives the executive a means for checking irregular occurrences in relation to all merchandise under his direction. Other advantages and beneficial results in operation will be apparent from a careful consideration of the above description and the stated mode of operation taken in connection with the illustrative drawings appended thereto.

I claim:—

1. An inventory and sales indicating device comprising a holder provided with a longitudinally extending tally receiving recess having a lateral opening co-extensive therewith, and a plurality of tallies freely insertable into and removable from said recess through said opening and bearing markings representing unit values and other markings representing time data, said markings being arranged at edge portions of said tallies and visible through said opening when the tallies are stacked one upon another in said recess.

2. An inventory and sales indicating device comprising a holder provided with a longitudinally extending tally receiving recess having a lateral opening co-extensive therewith, a plurality of tallies freely insertable into and removable from said recess through said opening and a removable tally supporting member at one end of said recess of the tally holder.

3. An inventory and sales indicating device comprising a holder provided with a longitudinally extending tally-receiving recess having a lateral opening co-extensive therewith and a longitudinally extending groove parallel with said recess, a plurality of tallies freely insertable into and removable from said recess through said opening and a tally counting device slidably arranged in said groove.

4. An inventory and sales indicating device comprising a holder provided with a longitudinally extending tally-receiving recess having a lateral opening, and a plurality of tallies freely insertable into and removable from said recess through said opening, said tallies being arranged one upon another in said recess and with their edge portions shaped to facilitate the passage of a removing tool between contiguous tallies.

5. Apparatus according to claim 4 and wherein each tally is provided with a recess to form a shoulder for engagement with a removing tool.

6. An inventory and sales indicating device comprising a holder provided with a longitudinally extending tally receiving recess having a lateral opening, and a plurality of tallies freely insertable into and removable from said recess through said opening, said tallies having tapered edge portions shaped to facilitate the insertion of one tally between two other contiguous tallies.

7. An inventory and sales indicating device comprising a tally holder for receiving a plurality of tallies and having an opening extending along one side to expose edge portions of tallies arranged therein, and a tally counting device slidably mounted on said holder parallel with and adjacent to said opening.

8. An inventory and sales indicating device comprising a holder provided with a longitudinally extending tally receiving recess having a lateral opening co-extensive therewith, and a plurality of tallies insertable into and removable from said recess through said opening and bearing markings representing unit values and other markings representing time data, said markings being arranged at edge portions of said tallies and visible through said opening when the tallies are stacked one upon another in said recess.

9. An inventory and sales indicating device comprising a holder provided with a longitudinally extending tally receiving recess having a lateral opening co-extensive therewith, a plurality of tallies insertable into and removable from said recess through said opening and a removable tally supporting member at one end of said recess of the tally holder.

10. An inventory and sales indicating device comprising a holder provided with a longitudinally extending tally-receiving recess having a lateral opening co-extensive therewith and a longitudinally extending groove parallel with said recess, a plurality of tallies insertable into and removable from said recess and a tally counting device slidably arranged in said groove.

11. An inventory and sales indicating device comprising a holder provided with a longitudinally extending tally-receiving recess having a lateral opening, and a plurality of tallies insertable into and removable from said recess through said opening, said tallies being arranged one upon another in said recess and with their edge portions shaped to facilitate the passage of a removing tool between contiguous tallies.

12. Apparatus according to claim 11 and wherein each tally is provided with a recess to form a shoulder for engagement with a removing tool.

13. An inventory and sales indicating device comprising a holder provided with a longitudinally extending tally receiving recess having a lateral opening, and a plurality of tallies insertable into and removable from said recess through said opening, said tallies having tapered edge portions shaped to facilitate the insertion of one tally between two other contiguous tallies.

HENRY BOOTH.